May 31, 1938.   E. E. BODGE   2,119,415
PIPE INSULATION-MOLD
Filed Aug. 26, 1936
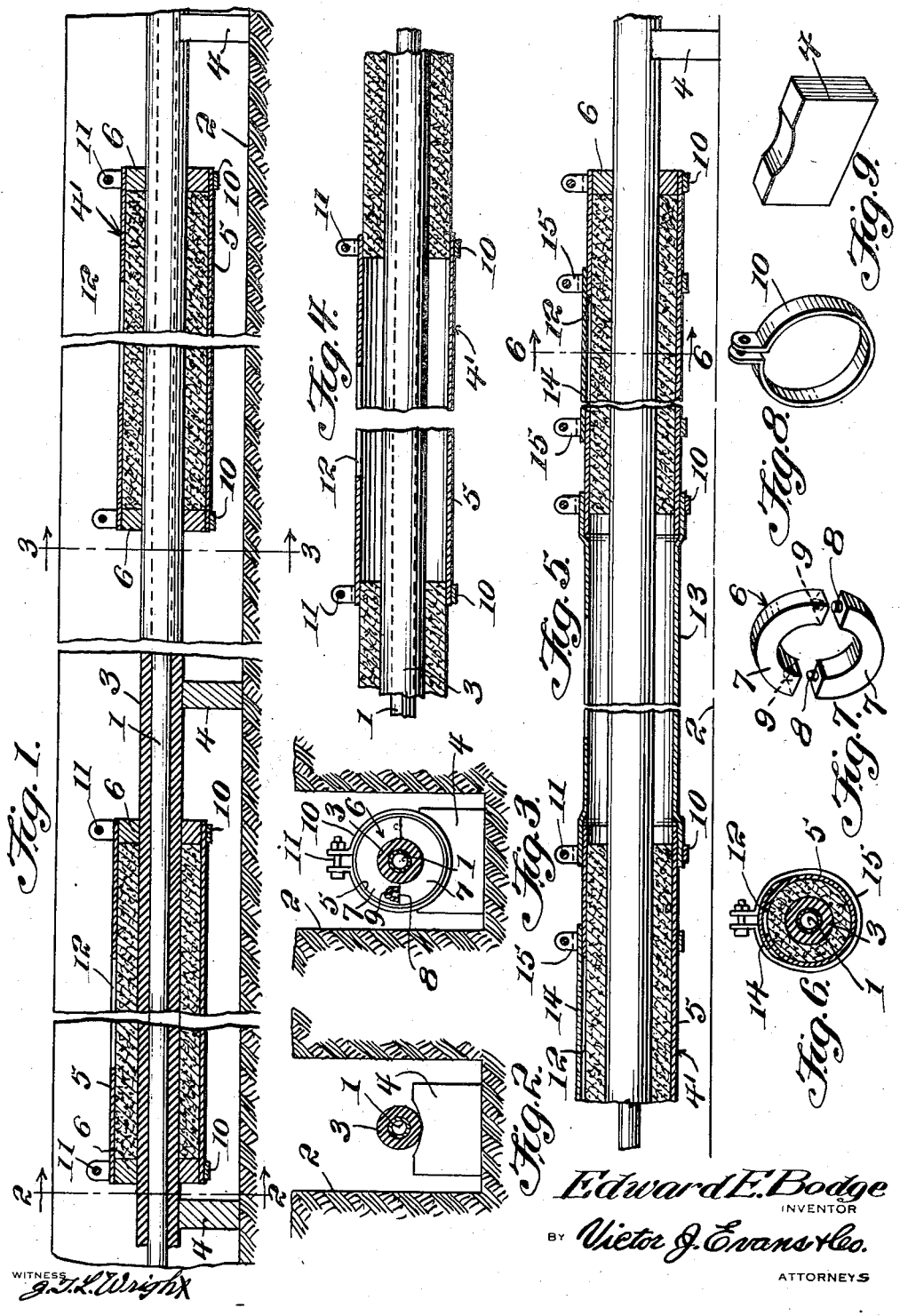
Edward E. Bodge
INVENTOR
BY Victor J. Evans & Co.
ATTORNEYS Patented May 31, 1938

2,119,415

UNITED STATES PATENT OFFICE 2,119,415

PIPE INSULATION MOLD

Edward E. Bodge, Honolulu, Territory of Hawaii, assignor to von Hamm Young Company, Limited, a corporation of Territory of Hawaii Application August 26, 1936, Serial No. 98,035

1 Claim. (Cl. 25—127)

This invention relates to pipe insulation and has for the primary object the provision of a simple and inexpensive means for insulating and water proofing pipes or tubing after the laying and testing out of the latter for leaks and similar defects whereby temperatures of liquids, gases or air conveyed by the pipes will not be changed by atmospheric or earth temperatures and which may be easily and quickly applied to the pipes at a minimum cost.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a fragmentary vertical sectional view showing a pipe line located in a trench and partly covered or insulated in accordance with the present invention.

Figure 2 is a transverse sectional view taken on the line 2—2 of Figure 1.

Figure 3 is a transverse sectional view taken on the line 3—3 of Figure 1.

Figure 4 is a fragmentary vertical sectional view showing parts of the pipe insulated with the insulation acting as supports for a mold section prior to receiving insulating material to complete the insulating operation.

Figure 5 is a fragmentary sectional view showing the insulating of the pipe and the leaving of the mold sections thereon when desired.

Figure 6 is a transverse sectional view taken on the line 6—6 of Figure 5.

Figure 7 is a perspective view illustrating the spacer.

Figure 8 is a perspective view illustrating a split clamp.

Figure 9 is a perspective view illustrating a support or cradle element for the pipe.

Referring in detail to the drawing, the numeral 1 indicates a pipe to which my invention is adapted and forming a pipeline for the conveyance of liquid, gas or air. The invention is adaptable to the pipe after the laying or installing of the latter. In the drawing the pipe is shown as occupying a position within a trench 2 and may have applied thereto a covering 3 of any desirable material. At spaced intervals the pipe is supported by blocks or cradles 4 so that the pipe and its covering 3 will be spaced from the walls of the cradle to permit sectional molds 4' to be adapted thereto. The molds or sections thereof are applied to the pipe in such a way that there will be a limited distance provided between each section. Each section is in the form of a shell 5 and is supported upon the covering 3 by spacers 6 each including semicircular shaped sections 7, one section having dowel pins 8 to fit in sockets 9 of the other section. After the shell 5 has been mounted on the spacers split clamps 10 are placed about the shell directly over the spacers and drawn tightly together by bolts or similar fasteners 11. The shell 5 is provided with an opening 12 so that insulating and water proofing material may be poured into the shell to form about the covering 3 between the spacers and the shell 5 a desirable monolithic mass which is impervious as possible to the penetration of water, air or gas. After the insulating material has hardened the shell 5 is removed, also the spacers. The insulated masses having the spaces therebetween then are connected by adapting thereto one of the mold shells 5 so that the space between the insulated masses may be filled with the insulating material and after the hardening thereof the pipe will be entirely covered from one end to another so that the pipe will be thoroughly insulated either from heat, cold and the penetration of moisture or air. The insulation may be made from asphalt or any other suitable material, the only requirements being that such material will flow freely when required, heated or otherwise and will harden or set to form the durable monolithic mass impervious to the penetration of water, air or gas.

After the hardening of the insulating material the mold sections may be entirely removed or in some instances it may be desired to leave the shells of the mold assembled on the masses and the openings 12 may be closed by covers 14 held in place by split clamps 15. To fill the space between the masses, a shell 13 is fitted thereto and held in place by the clamps 10 so that insulating material may be filled in about the pipe between the already hardened masses. When the mold sections or shells are removed they can be again used as many times as desired.

A pipe covered in the manner described will be so insulated that the liquid, gas or air conveyed thereby will not be changed as to temperature by atmospheric temperatures or earth temperatures and also the elimination of leaks of air or water through the insulation prevents deterioration to the insulating material as well as to the pipe. The leaks are prevented by the fact that the outside insulation of the pipe is poured in place in forms which cover the entire structure at temperatures which insure monolithic adhesion and leave no joints or spaces to be afterwards patched. Insulating of the pipes in the manner described can be easily and economically accomplished and also permits the laying of pipes and the testing of such pipes for defects prior to the application of the insulation.

Having described the invention, what is claimed is:—

An apparatus for molding insulation on a pipe comprising a plurality of mold shells positioned to surround a pipe and in spaced relation thereto, certain of said shells receiving therein the ends of the other shells, spacers supporting certain of the shells on the pipe and the other shells supported by the shells carried by said spacers, said shells having slots to permit placing of insulation material in the shells to fill the spaces between the shells and the pipe and the spacers, split adjustable clamps binding said shells together and positioned over the spacers, cover plates for closing the slots, and split adjustable clamps for removably securing the covers in place on the shells.

EDWARD E. BODGE.